C. C. McCOLGAN.
VEHICLE SIGNALING DEVICE.
APPLICATION FILED FEB. 8, 1915.
1,162,377.
Patented Nov. 30, 1915.
3 SHEETS—SHEET 2.
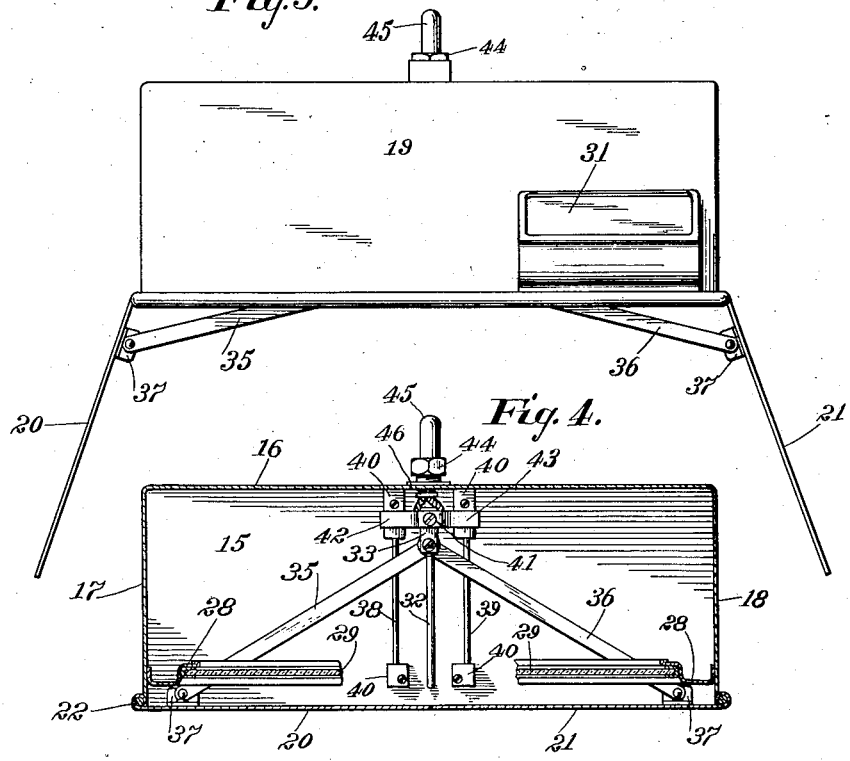
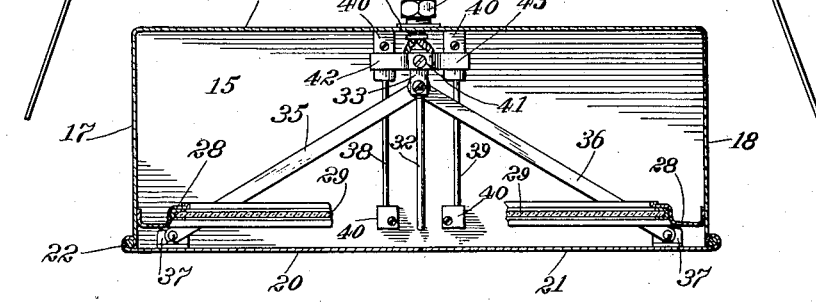
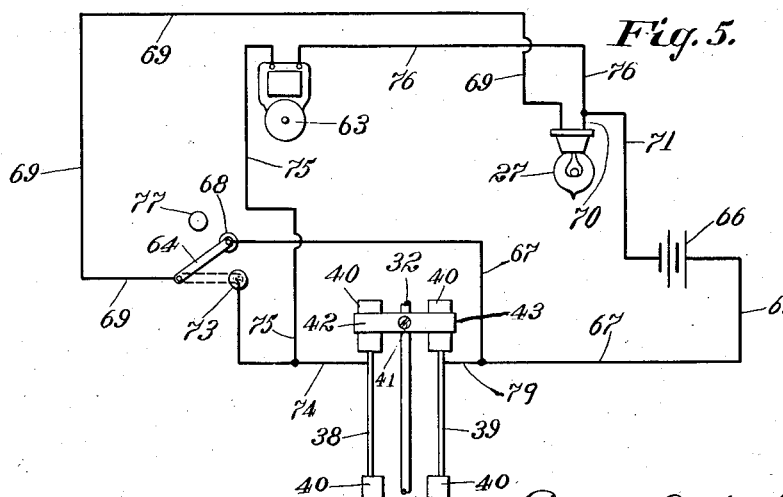
Witnesses
Porter H. Flautt
Bertha K. Walter
Inventor
Charles C. McColgan
By
Mann & Co,
Attorneys C. C. McCOLGAN.
VEHICLE SIGNALING DEVICE.
APPLICATION FILED FEB. 8, 1915.
1,162,377.
Patented Nov. 30, 1915.
3 SHEETS—SHEET 3.
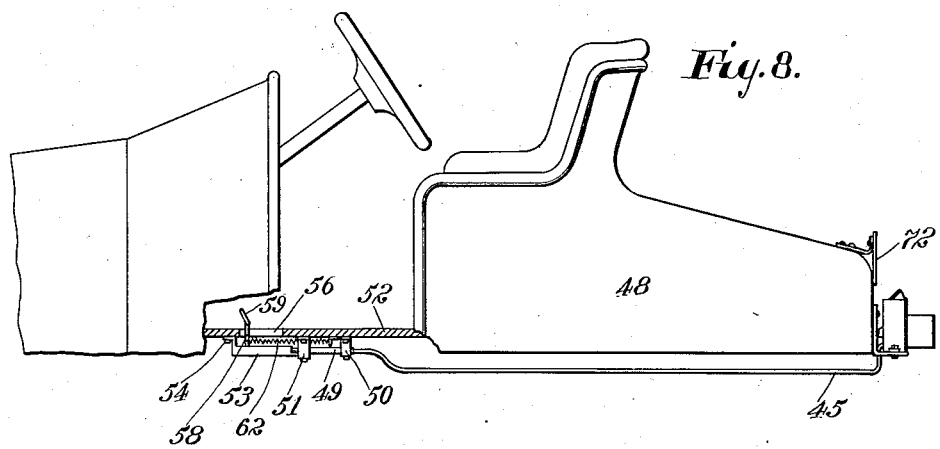
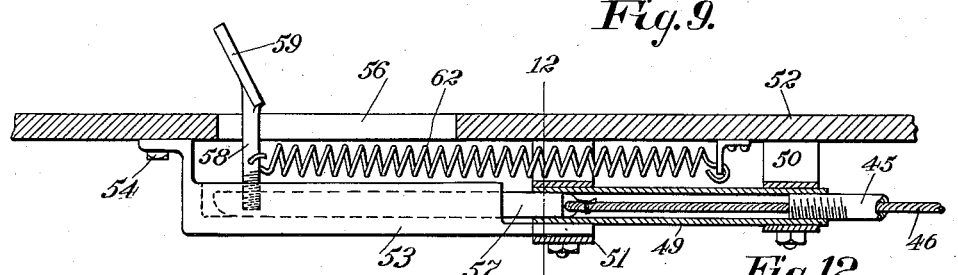
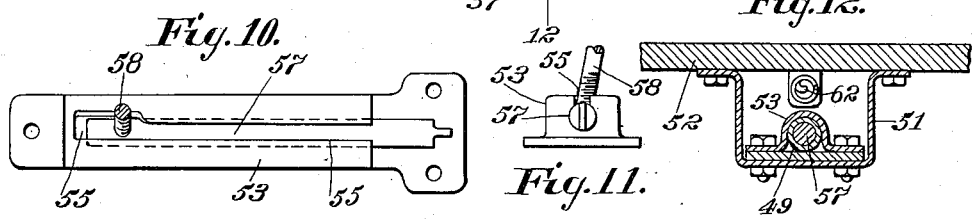
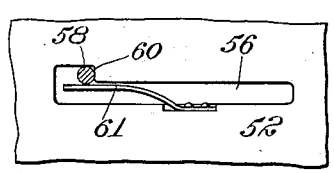
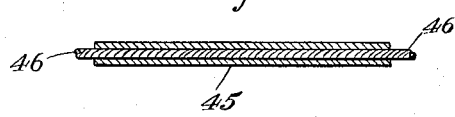
Witnesses
Porter H. Flautt
Bertha K. Walter
Inventor
Charles C. McColgan
By Mann & Co.
Attorneys

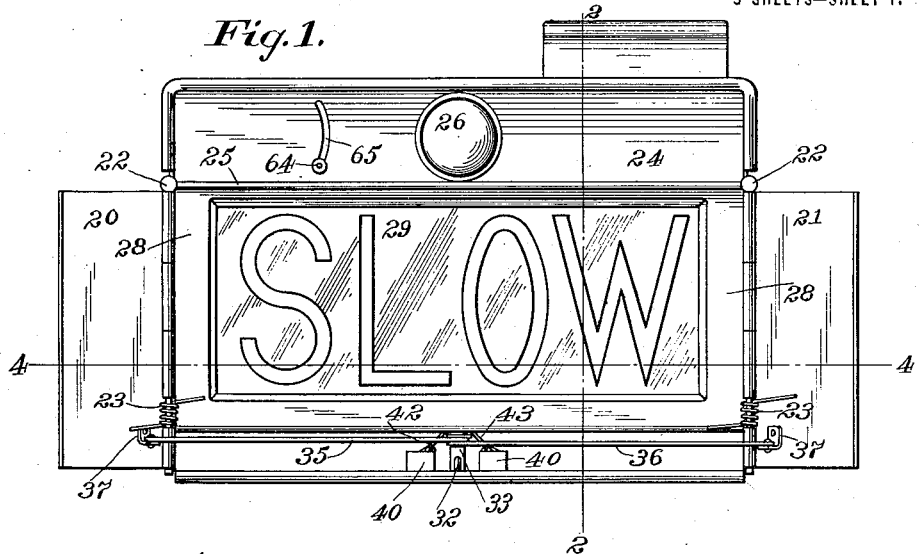
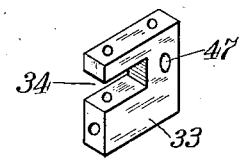
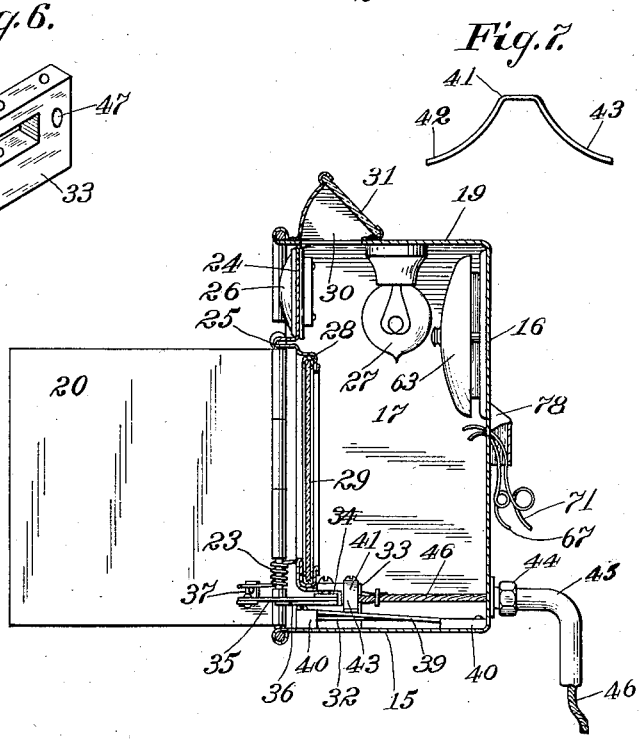

UNITED STATES PATENT OFFICE.

CHARLES C. McCOLGAN, OF BALTIMORE, MARYLAND.

VEHICLE SIGNALING DEVICE.

1,162,377. Specification of Letters Patent. Patented Nov. 30, 1915.

Application filed February 8, 1915. Serial No. 6,706.

*To all whom it may concern:*

Be it known that I, CHARLES C. McCOLGAN, a citizen of the United States, residing at Baltimore, in the State of Maryland, have invented certain new and useful Improvements in Vehicle Signaling Devices, of which the following is a specification.

This invention relates to an improved vehicle signal device and is particularly designed for use on automobiles to indicate to a driver or operator of a vehicle at the rear that a change in the movement of the vehicle is about to take place.

The objects of the present invention are to improve the construction of devices of this character; to simplify the same; to construct them so that the single light employed in the signal device may be operated continuously as during the night or may be operated only when a signal is given and to also enable the single lamp to furnish the light for illuminating a license as well as for the signal at night.

A further object is to provide improved means for operating the signal device and an improved arrangement of circuits for controlling the operation of a bell and lamp.

With these, and other objects in view, the accompanying drawings illustrate the invention, in which,—

Figure 1, shows the signal device as viewed from the rear and during operation. Fig. 2, illustrates the same in vertical section,—the section being taken on the line 2—2 of Fig. 1. Fig. 3, shows the same in top plan. Fig. 4, illustrates the device in horizontal sectional plan, with the doors closed, as when the signal is in the normal inoperative condition,—the section being taken on the line 4—4 of Fig. 1. Fig. 5, illustrates in a diagrammatic way the electric circuits employed in the signal device. Fig. 6, shows a perspective detail of the detached guide block to which the door-actuating levers are connected. Fig. 7, illustrates the movable contact plate in edge view, which plate controls the circuits. Fig. 8, shows an automobile body,—the floor of which is partly in section to illustrate the operating devices and the connection between the same and the signal device at the rear. Fig. 9, illustrates an enlarged sectional detail through the floor of the vehicle to clearly present the operating devices. Fig. 10, shows the case and operating bar therein. Fig. 11, illustrates an end view of the same. Fig. 12, shows a vertical sectional detail through the device shown in Fig. 9,—the section being taken on the line 12—12 of Fig. 9. Fig. 13, shows in top plan the slot in the floor of the vehicle and operating bar therein, and Fig. 14, illustrates a sectional detail through the guide tube and flexible operating wire therein that connects the operating bar with the signal devices at the rear of the vehicle.

Referring to the drawings, and particularly Figs. 1 to 7 inclusive, it will be noted that the signal mechanism is inclosed in a casing or receptacle that has a horizontal bottom 15, a rear wall 16; two sides or end walls 17 and 18 respectively and a top 19. While the casing or receptacle in the present instance has a substantially rectangular shape, it may obviously be shaped otherwise. The vertical front edges of the two end walls 17 and 18, are curled or rolled to form eyes, so that doors 20, and 21, may be hung from said edges by means of pintles 22, and the free edges of the doors thereby be movable toward each other to close the front of the receptacle, as shown in Fig. 4, of the drawing. In the present instance springs 23, are coiled about the pintles so that an end thereof may press against the door and constantly press the same in a direction to open when released, as will presently be explained.

By referring to Figs. 1 and 2, it will be noted that the doors 20 and 21, are much shorter than the rear wall 16, and that between the top edges of the doors and the top 19 of the receptacle, the latter has an upper front wall section 24 with an out-turned horizontal flange 25, along its lower edge. A suitable lens 26, is fitted into an opening in the front wall section 24, so that light from a lamp 27, on the interior of the receptacle may be seen through the lens and the latter thereby serve as a tail light for the vehicle. Preferably the lens 26, is colored red to give a red light signal. A partition wall 28, is provided on the interior of the receptacle beneath the wall section 24 and a sign plate, preferably of glass 29, is secured in said partition so that words conveying a warning, such as "Slow" may be painted or otherwise attached to said glass and be exhibited to the driver of a vehicle at the rear when the doors 20 and 21, are opened to give a signal,—the single lamp 27, in the receptacle furnishing light for illuminating the letters on the glass plate. The receptacle also has an opening 30, in one wall and a clear glass plate 31, covers said opening to exclude dirt, rain or snow from the interior of the receptacle but allows the rays of light from the lamp 27, to be projected through said opening. The purpose of this opening is to provide light for illuminating the license tag or plate required to be carried by all motor vehicles, and the opening in the receptacle will be located in the top or side wall according to the location of the license plate. In the present instance the opening is provided in the top wall 19, of the receptacle. From the foregoing explanation it will be seen that the single lamp 27, in the receptacle will serve to illuminate the lens 26, for tail light purposes; will provide light for the sign plate 29, when the doors are opened and will also provide light for illuminating the license tag, 72. A horizontal guide rod 32, extends across the receptacle from front to rear and is elevated with respect to the bottom and a block 33, is slidably mounted on said rod so as to be moved horizontally across the bottom of the receptacle. This block has a horizontal recess 34, at one side to receive the inner ends of two bars 35 and 36 and a pin 37, extends down through the block and through perforations in the ends of the bars whereby to pivotally connect the latter to the block. The outer end of the bar 35, pivotally engages a bracket plate 37, on the inner side of door 20, while the outer end of bar 36, is pivotally connected to a bracket plate 37, on the door 21, and by means of these connections the doors and the sliding block 33, are movable simultaneously. Two contact rods 38 and 39, respectively are provided in the receptacle at opposite sides of the guide rod 32, and said guide rods are sustained in stationary blocks 40, of insulating material so they may be insulated electrically from each other and also from the receptacle. A contact plate 41, straddles the guide block 33, to which it is rigidly attached so as to move therewith and this plate has one end 42, curved downwardly in order that it may engage rod 38, and another end 43, extending downwardly to engage rod 39, for a purpose presently to be explained. The rear wall 16, of the receptacle is provided with a coupling 44, around an opening in said wall, but not shown, and a tube 45 has one end rigidly connected to said coupling. A flexible wire 46, extends through the tube 45, and enters the receptacle and the end of this wire is passed through an opening 47, in the guide block and secured therein. The gage of this wire 46, is such as to practically fill the interior of the tube 45, so that bends or buckles cannot be formed in the wire, even when the wire is pushed through the tube from one end thereof. The tube, being flexible, can be bent to pass around various obstructions under the vehicle body between the rear end of the latter, where the signal device is located, and the front thereof, where the operating devices are located, and notwithstanding these bends in the tube 45, the wire 46, will readily move therethrough when pushed thereon from one end.

By referring to Figs. 8 and 9, of the drawing it will be seen that the tube 45, in the present instance extends forward under the body 48, and connects with a slightly larger but short tube 49, that is sustained in brackets 50 and 51, under the floor 52. The bracket 51, also sustains one end of a horizontal bearing sleeve 53,—the other end of which latter is secured by bolts 54, directly to the under side of the floor 52. This bearing sleeve has a slot 55, extending longitudinally along the upper side thereof and directly beneath a horizontal slot 56, in the floor. A horizontal stem or bar 57, is located in said sleeve and is movable longitudinally therein and at the forward end this stem or bar 57, carries an upwardly projecting post 58, that projects through the slot 55, in the sleeve and also extends upwardly through the slot 56 in the floor. The upper end of the post 58, carries a foot plate 59, which may be actuated by the foot of the driver or operator. By referring to Fig. 9, it will be seen that the wire 46, extends through the tube 49, and engages the end of stem or bar 57, which bar-end enters said tube and is movable longitudinally therein. A notch is formed at the front end of the floor slot 56, to produce a shoulder 60, as seen in Fig. 13, and a spring plate 61, is located in the slot 56, to press the post 58, laterally and direct it to a position in front of the shoulder 60, which will hold it there until released by the foot. The stem or bar 57, being circular in cross-section will readily rock in the bearing sleeve 53, to permit the post to assume the position in front of the shoulder 60, and thereby keep the wire 46, normally drawn forward. A spiral spring 62, engages the post 58, and constantly tends to pull the post 58, and stem 57, rearwardly against shoulder 60. From the foregoing explanation it is to be understood that when post 58, is held against shoulder 60, wire 46, will be drawn forward and as the rear end of this wire is attached to sliding block 33, in the receptacle at the rear of the vehicle, said block will be drawn toward the wall 16 of said receptacle. As the bars 35 and 36 in the receptacle each have an end pivotally connected to the block 33, said bar-ends will also be held inwardly and thereby keep the doors 20 and 21 in the normally closed position, shown in Fig. 4, of the drawing. When the block 33, is in the normal inoperative position and the doors closed, the ends 42 and 43 of the contact plate 41, will engage the rear insulating blocks 40, and thereby be held out of contact with the contact rods 38 and 39, as shown in Fig. 4.

The purpose of the contact plate 41, and rods 38 and 39, will now be explained. An audible signal device, such as a bell 63, is provided in the receptacle and a switch 64, is also provided in the receptacle and has an operating portion projecting through a slot 65, in the upper front wall section 24, of the receptacle where it may be operated without opening the doors to effect certain changes in the circuits as will now be explained, attention being directed to Fig. 5. At some convenient place on the vehicle I provide a current supply or battery 66, from which current may be supplied to the lamp 27, and bell 63; and I provide an arrangement of circuits whereby when the doors are closed both the lamp and bell may be cut off from the current supply, or, when the doors are closed the lamp may be maintained in circuit with the current supply but the bell cut off therefrom. When however, the doors are opened to give a warning signal I prefer that both the lamp and bell shall be thrown into circuit with the current supply and both thereby be operated. In carrying out this part of my invention I provide a connection, such as wires 67 and 79 between one side of the battery 66, and the contact rod 39 and said wire 67 also extends to and connects with a contact point 68, of the switch. A wire 69, leads from switch blade 64, to one side of the lamp 27, and wires 70 and 71, connect the other side of the lamp with the other side of the battery or current supply 66. Normally, when the doors are closed, the contact plate 41, will have position so that its ends 42 and 43, rest on the insulating blocks 40; but even then, if switch blade 64, is thrown so as to connect contact point 68, and wire 69, a circuit from the current supply through the lamp 27, will be completed and the lamp will burn continuously as is desirable at night, and particularly so in this instance because that lamp furnishes the light to illuminate the license tag 72, which is shown on the rear of the body in Fig. 8, of the drawing. On the other hand, if it is desired to normally cut out the lamp when the doors are closed and contact 41, is out of engagement with rods 38 and 39, the switch bar 64, may be moved into engagement with contact point 73, so that connection between wires 67 and 69 will be broken and the lamp will thereby be normally cut off from the current supply. When the switch bar 64, therefore is in engagement with contact 73, and the doors are opened to give a signal,—the opening of the doors will cause contact plate 41, to move forward and engage rods 38 and 39 so that two circuits will be formed,—one through the lamp and one through the bell, as follows: For the lamp,—from current supply 66, by wires 67 and 79, to rod 39, across plate 41, to rod 38, by wire 74, to contact point 73; then through switch blade 64, to wire 69, and one side of lamp 27, then by wires 70 and 71 back to battery or current supply. For the bell,—a branch 75, leads from wire 74, to one side of the bell and from the other side of the bell the return will be by wires 76, and 71 to battery or current supply. Thus, when switch 64, is engaged with contact 73, and the doors opened, both the bell and lamp will operate, but when the doors are closed the bell and lamp will both be cut off from the current supply. In case it is desired to cut out the lamp entirely but allow the bell to operate when the doors are opened the switch bar 64, may be moved to a stop contact 77, that has no electrical connection and only serves to hold the switch out of all electrical circuits, whereupon no current can pass through the switch blade to the lamp but the bell circuit will be maintained when the contact 41, engages rods 38 and 39 by the opening of the doors. From the foregoing explanation it will be understood that if during the day it is desired to cut out the lamp the switch blade will be moved out of contact with both points 68 and 73, but the bell will operate when the doors are opened; or, if it is desired to operate both bell and lamp only when the doors are opened, the switch blade will be moved to engage contact 73, and finally, if it is desired to operate the lamp continuously and only operate the bell when the doors are opened, switch bar 64, will be moved into engagement with contact 68. The two wires 67 and 71, to and from the battery are preferably led into the receptacle through an opening in the wall 16, and a hood 78, is preferably provided at the point of entry to protect the same from the elements of the weather.

Having thus described my invention what I claim is,—

1. In a signaling device for vehicles the combination with a box having a lamp chamber, of a translucent signal plate at one side of the lamp chamber; two doors hinged to the box to normally conceal the signal plate; a reciprocating bracket plate on the interior of the box; lever means in the box and connecting the bracket plate with the doors; a lamp; an audible alarm; a switch connected with the bracket plate and movable thereby; a current supply and connections including the current supply, lamp, audible alarm and switch whereby to complete the circuit simultaneously with the movement of the door moving means.

2. In a signaling device for vehicles the combination with a box having a lamp chamber, of a stationary signal plate at one side of the lamp chamber; a tail-light lens in the case above the stationary plate; two doors hinged to the box below the tail light lens; a lamp in the box; a current supply; means in the box for operating the two doors; a switch also in the box said switch being movable with the means that actuate the two doors; an audible alarm; connections between the current supply, switch, lamp and audible alarm, said connections normally including the lamp and normally, when the doors are closed, excluding the audible alarm.

3. In a signaling device for vehicles the combination with a receptacle having a tail-signal light-passage and a license-tag light-passage, of a signal plate in the receptacle; door means for normally covering the signal plate; a lamp in the receptacle; an audible signal in the receptacle; a current supply, and means for forming electric connections between the current supply, lamp and audible signal when the signal plate is uncovered and means for maintaining a connection from the current supply through the lamp while the signal plate is covered.

In testimony whereof I affix my signature in presence of two witnesses.

CHARLES C. McCOLGAN.

Witnesses:
　WILLIAM D. GOULD,
　LEO HAMBURGER.